United States Patent [19]

Sutton, Jr.

[11] Patent Number: 5,325,813
[45] Date of Patent: Jul. 5, 1994

[54] CURTAIN CONTROL SYSTEM FOR ANIMAL ENCLOSURES

[76] Inventor: James A. Sutton, Jr., 541 Gaither Rd., Statesville, N.C. 28677

[21] Appl. No.: 921,233

[22] Filed: Jul. 29, 1992

[51] Int. Cl.⁵ .............................................. A01K 31/18
[52] U.S. Cl. ...................................... 119/21; 454/239
[58] Field of Search ................ 119/21, 22; 236/49.5; 160/331, 338; 454/229, 239

[56] References Cited

U.S. PATENT DOCUMENTS

| | | | |
|---|---|---|---|
| 1,684,929 | 9/1928 | Snavely . | |
| 2,489,515 | 11/1949 | Blake et al. | 98/33 |
| 2,636,933 | 4/1953 | Lecher | 175/336 |
| 2,995,077 | 8/1961 | Kitson | 98/33 |
| 3,000,290 | 9/1961 | Rodick et al. | 98/33 |
| 3,149,293 | 9/1964 | Farkas | 332/15 |
| 3,285,153 | 11/1966 | Hartsough | 98/33 |
| 3,443,121 | 5/1969 | Weisbrod | 307/117 |
| 3,915,377 | 10/1975 | Sutton, Jr. | 236/49 |
| 3,973,173 | 8/1976 | Smith | 317/142 TD |
| 4,113,175 | 9/1978 | Sutton, Jr. | 236/46 A |
| 4,184,538 | 1/1980 | Rauenhorst | 165/66 |
| 4,241,871 | 12/1980 | Newell, III et al. | 236/49 |
| 4,251,026 | 2/1981 | Siegel et al. | 236/49 |
| 4,428,278 | 1/1984 | Sutton, Jr. | 98/33 R |
| 4,602,739 | 7/1986 | Sutton, Jr. | 236/46 F |
| 4,776,385 | 10/1988 | Dean | 165/16 |
| 5,031,574 | 7/1991 | McDowell | 119/21 |
| 5,119,762 | 6/1992 | Yockey et al. | 119/21 |
| 5,205,785 | 4/1993 | Richardson et al. | 119/21 X |

Primary Examiner—Robert P. Swiatek
Attorney, Agent, or Firm—W. Thad Adams, III

[57] ABSTRACT

A curtain control system for controlling curtains of an animal enclosure having an electrically-operated forced air ventilation system and a plurality of adjustable drop curtains. Each of the drop curtains has an associated curtain control device for providing supplemental ventilation during power failure or excess temperatures in the enclosure. Each of the curtain control devices includes a winch for winding and unwinding a curtain control cord extending between the curtain and the winch. A winch release is moveable between a hold position for normally holding the winch handle stationary to prevent unwinding of the curtain control cord and a release position to release the winch handle and thereby release the curtains to a dropped, open position. Electromagnets hold the winch releases in the hold position during application of current and permit movement of the winch release to the release position upon interruption of electric current to the electromagnets. A circuit electrically cooperates with the electromagnets for interrupting the flow of electricity to all of the curtain control devices when any single winch release moves to the release position to thereby cause the release of all of the curtains upon the release of any of the curtains.

6 Claims, 7 Drawing Sheets

CURTAIN CONTROL SYSTEM FOR ANIMAL ENCLOSURES

TECHNICAL FIELD AND BACKGROUND OF THE INVENTION

This invention relates to a curtain control system for animal enclosures such as poultry houses. Houses of this type and prior art systems for controlling ventilation and preventing or reducing animal mortality during power interruptions and extremely warm weather are disclosed in applicants' prior U.S. Pat. Nos. 3,915,377, 4,113,175, 4,428,278, and 4,986,469. Systems such as shown in these prior patents have substantially reduced animal mortality and labor requirements for raising poultry in large, environmentally controlled enclosures. Nevertheless, on some occasions inadvertent release of the some of the curtains can cause environmental conditions resulting in stress and mortality to the animals.

As poultry houses have become larger and more environmentally controlled, the sides of the enclosure are sometimes divided into two or four separate curtain units, with each unit having its own curtain release device. Since all of these units are designed to release when electric current is interrupted, all of the curtains should drop into their open position to permit natural ventilation during any power interruption.

In an poultry house having so-called "tunnel" ventilation, an interruption of electrical power or high temperature causes the curtain winches to be released and the curtains to drop. However, it can happen that power is restored or the temperature drops before all of the curtains release. In some other instances, one or more of the curtains may be inadvertently dropped, with the remainder of the curtains left in their raised, closed position. In both of these instances the flow of air is short-circuited. Air flow through the enclosure moves from the open curtain area in a direct path to the ventilation fans, bypassing other areas of the enclosure. Poultry in the bypassed areas are deprived of adequate air flow and consequently suffer. In this instance, the poultry would be better off if all of the curtains had inadvertently dropped, rather than just some of them.

Some systems have motorized curtain systems which operate to close the curtains when the enclosure changes from natural ventilation to fan-powered tunnel ventilation. In some instances the curtains or the cords operating the curtains may bind or snag, thus increasing the pull on the winch handle which is held in place with a curtain release device. If the curtain release device fails to hold, the particular set of curtains is released, again causing a short circuit in the air flow path. Animals out of the path of air flow suffer from loss of fresh air, increased temperature, and lack of air movement.

Prior art systems do not provide a method and apparatus for insuring the positive release of all of the sets of curtains when any one set of curtains is released. The invention disclosed in this application and claimed in the claims accomplishes this new function.

SUMMARY OF THE INVENTION

Therefore, it is an object of the invention to provide a curtain release system which releases all of the sets of curtain release devices within the system if any one set is released, for whatever reason.

It is another object of the invention to provide a curtain release system which provides a sensing device on each curtain control device which senses the status of all of the other curtain control devices within the system.

It is another object of the invention to provide a method of controlling ventilation in an animal enclosure which prevents irregular air flow paths resulting from the release of less than all of the curtain release devices within the curtain release system.

These and other objects of the present invention are achieved in the preferred embodiments disclosed below by providing a curtain control system for controlling curtains of an animal enclosure having an electrically-operated forced air ventilation system and a plurality of adjustable drop curtains. Each of the drop curtains has an associated curtain control device for providing supplemental ventilation during power failure or excess temperatures in the enclosure. Each of the curtain control devices includes a winch for winding and unwinding a curtain control cord extending between the curtain and the winch, the winch having a winch holding means. Winch release means are moveable between a hold position for normally holding the winch handle stationary to prevent unwinding of the curtain control cord and a release position to release the winch holding means and thereby release of the curtains to a dropped, open position. Electromagnet means hold the winch release means in the hold position during application of current thereto, and permit movement of the winch release means to the release position upon interruption of electric current to the electromagnet means. In combination with the above elements known in the art is the improvement comprising circuit means electrically co-operating with the electromagnet means for interrupting the flow of electricity to all of the curtain control devices upon movement or change of any single winch release means to the release position to thereby cause the release of all of the curtains upon the release of any of the curtains.

According to one preferred embodiment of the invention, the circuit means includes a reed switch wired in series with the electromagnetic means and having a closed position in the presence of magnetic field and an open position in the absence of magnetic field. The magnetic field is only present when the curtain release means is in the hold position. A toggle switch is wired in series with the electromagnetic means and in parallel with the reed switch and has a closed position for initiating the flow of electricity to the electromagnet. Each of plurality of the curtain control devices is wired in series with each other.

According to another preferred embodiment of the invention, the winch release means comprises an electrically-attractable hinge pivotable between the hold position in contact with an electromagnet and the release position pivoted, spaced-apart position from the electromagnet and a hook attached to the hinge for receiving and retaining the winch handle against unwinding while the release means is in the hold position.

According to yet another preferred embodiment of the invention, the hook is adjustable to a manual, non-automatic position to manually hold the winch handle when the electric power is interrupted to the winch release means.

An embodiment of the method according to the invention comprises a method of controlling the curtains of an animal enclosure having an electrically-operated forced air ventilation system and a plurality of adjustable drop curtains, each of the drop curtains having an associated curtain control device for providing supplemental ventilation during power failure or excess temperatures in the enclosure. Each of the curtain control devices includes a winch for winding and unwinding a curtain control cord extending between the curtain and the winch, the winch having a winch handle. Winch release means are moveable between a hold position for normally holding the winch handle stationary to prevent unwinding of the curtain control cord and a release position to release the winch handle and thereby release of the curtains to a dropped, open position. Electromagnet means hold the winch release means in the hold position during application of current thereto, and permit movement of the winch release means to the release position upon interruption of electric current to the electromagnet means. The improved method comprises the steps of interrupting the flow of electricity to all of the curtain control devices upon movement or change of any single winch release means to the release position; and thereby causing the release of all of the curtains upon interruption and release of any of the curtains.

According to another preferred embodiment of the invention, the method includes the further steps of providing a reed switch wired in series with the electromagnetic means and having a closed position in the presence of magnetic field and an open position in the absence of magnetic field; providing a toggle switch wired in series with the electromagnetic means and in parallel with the reed switch and having a closed position for initiating the flow of electricity to the electromagnet, wiring each of plurality of the curtain control devices in series with each other, and thereby causing the release of all of the curtains upon the interruption of electric current and release of any of the curtains.

BRIEF DESCRIPTION OF THE DRAWINGS

Some of the objects of the invention have been set forth above. Other objects and advantages of the invention will appear as the invention proceeds when taken in conjunction with the following drawings, in which.

DESCRIPTION OF THE PREFERRED EMBODIMENT AND BEST MODE

Figure 1:
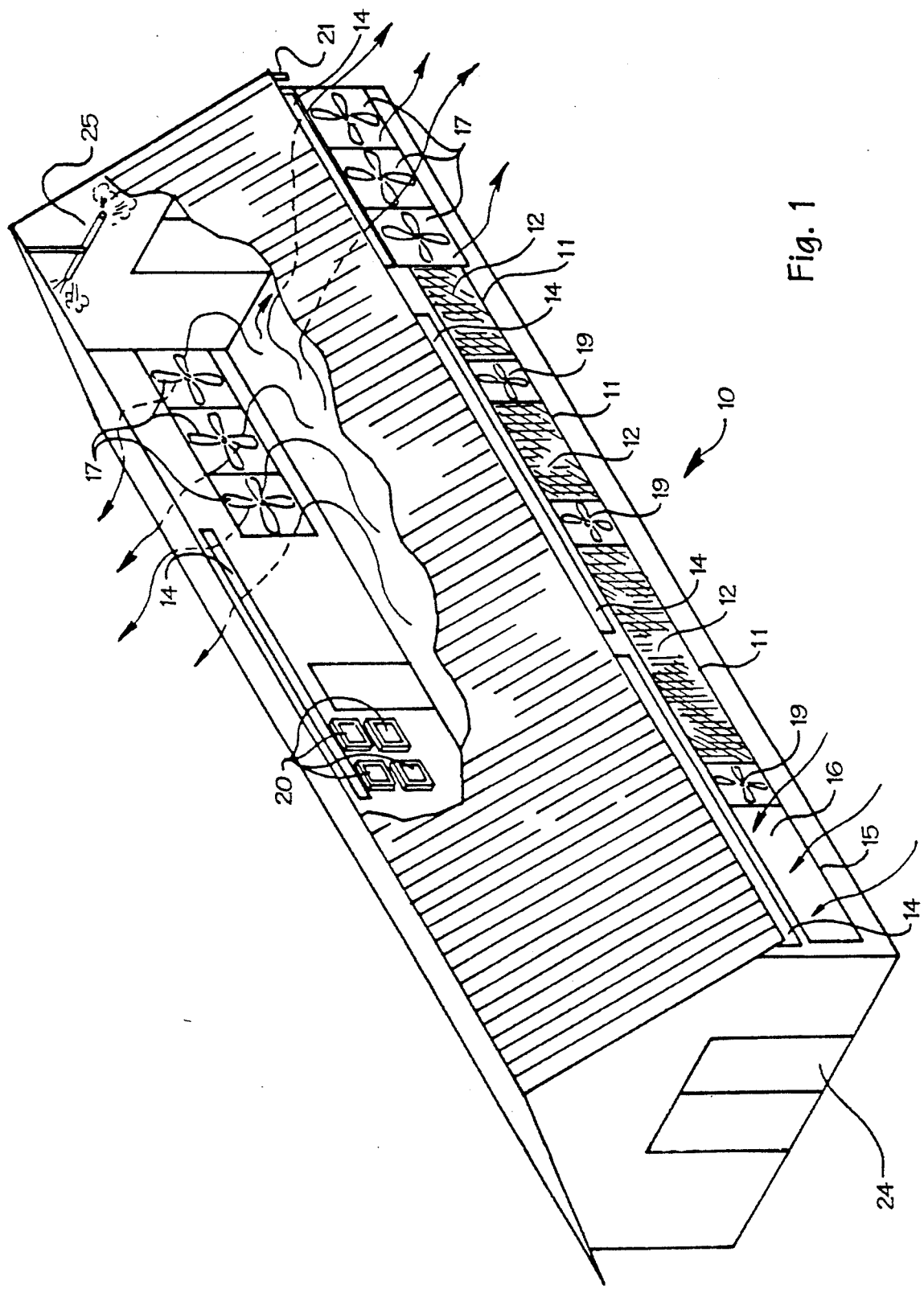
FIG. 1 is a perspective view of a poultry house equipped according to a preferred embodiment of the invention.

Referring now specifically to the drawings, a poultry house having a powered ventilation system and several curtain release devices controlling ventilation curtains according to the present invention is illustrated in FIG. 1 and shown generally at reference numeral 10. Poultry house 10 is a relatively low, long enclosure with an open sidewalls 11 along one side. The open sidewalls are equipped with adjustable curtains 12 of the type which are mounted below the opening and which are raised to cover the opening. The curtains 12 are held in the raised, closed position by a winch or some similar device and are controlled electrically to fall open to provide supplemental emergency ventilation should power to the ventilation fans fail. House 10 also includes a series of air vents 14 positioned along the top of the sidewalls of the house 10. These vents 14 may be intermittent, as shown, or they may be continuous.

An opening 15 covered by curtains 16 adjacent one end of house 10 operates in conjunction with a series of tunnel ventilation fans 17, as is also shown in FIG. 1.

Sidewall ventilation fans 19 are mounted in the sidewall of house 10 between adjacent sidewall openings 11.

Tunnel ventilation fans 17, sidewall ventilation fans 19, curtains 12 and curtains 16 are all electrically connected to a ventilation control apparatus 20 which is programmed to control each of these elements based upon the outside ambient temperature sensed by a temperature sensor 21 mounted at some suitable exterior location.

Description of Ventilation Method

The house 10 as described above functions in three distinct modes depending upon ambient outside temperature.

Low Temperature Forced Sidewall Ventilation Mode

At relatively low temperatures on the order of 60–65 degrees F. and below, sidewall fans 19 operate to exhaust air from the house 10 and draw in fresh air. Air is drawn in through vents 14, thereby providing sufficient cross-ventilation. With the use of the control apparatus 20 the minimum ventilation fans 19 operate at an interval the span of which is controlled by the temperature outside the house 10. Generally, the higher the temperature the higher the level of moisture in the air and the higher the rate at which it must be exchanged to maintain proper, healthful conditions within house 10. A high temperature override based upon the inside temperature can be used to increase the run time of the fans 19 and/or open the curtains 12 and 16 should the temperature inside the house 10 exceed the permitted range. The control apparatus 20 also maintains the curtains 12 and 16 in a raised position covering the sidewall openings 11 and 15. Should the power fail, the curtains 12 and 16 are released, permitting them to fall open and thereby provide emergency ventilation. In this mode, tunnel fans 17 are disabled and do not operate.

Moderate Temperature Natural Ventilation Mode

As the outside temperature reaches about 60–65 degrees F., the moisture holding content of the air is sufficient to permit natural ventilation. In this mode, power consumption is reduced by lowering curtains 12 and 16 away from the sidewall openings 11 and 15. Natural cross-ventilation occurs as warm, moist air rises in house 10 and exits through one side vent 14 and is replaced by an intake of fresh air through the other sidewall openings 11 and 15. If desired, one fan 19 can be left running as a safely precaution and the curtains can be lowered to a predetermined level less than completely open as is desired to maintain temperatures within acceptable ranges. All of these steps are performed automatically by control apparatus 20.

Should the power fail, the curtains 12 and 16 are released to a full lowered position if not already there to thereby provide emergency ventilation. In the natural ventilation mode, tunnel fans 17 are disabled and do not operate.

High Temperature Tunnel Ventilation Mode

At about 80 degrees F. natural ventilation becomes inadequate to provide sufficient replacement of contaminated air. In addition, the heat itself on the poultry creates physiological stress which is manifested in an excessive respiration rate, rapid accumulation of carbon dioxide, decreased feed utilization efficiency and, in extreme cases, death. For this reason, tunnel ventilation is desirable.

At 80 degrees F. or any other desired setting, control apparatus 20 closes curtains 12 by raising them completely over the sidewall openings 11. Curtains 16 are lowered to the full open position and tunnel ventilation fans 17 are turned on by control apparatus 20. Relatively high velocity air is therefore pulled into house 10 through openings 15, moved along the length of house 10 and is exhausted through the tunnel ventilation fans 17 on the extreme opposite ends of the house 10. In effect, a "wind chill" is created, causing the poultry to sense a lower effective temperature than that indicated by a thermometer. Of course, the relatively high velocity air—on the order of 4.5 to 7.5 feet per second—also effectively removes contaminated air. In general, a complete change of air is desired every minute. The required fan capacity is determined by finding the product of the velocity and the cross-sectional area of the house 10. For example, to achieve a velocity of 6 feet per second (350 feet per minute) in a poultry house 40 feet wide and 12 feet high approximately 168,000 cubic feet per minute of air must be moved. Ideally, the area of sidewall openings 15 should be comparable to the cross-section of house 10.

A number of variations are possible. Fans 17 can be placed as shown in FIG. 1 or all on one of the end walls of house 10, or some on the end wall and others on the closely adjacent side walls. Fans can also be placed high in one gable end of the house. In an appropriate case, an air inlet can be created by opening a large door 24 on the end of the house opposite the tunnel ventilation fans.

Tunnel ventilation is most effective when combined with evaporative cooling. For this reason either foggets 25 or evaporative cooling pads (not shown) are preferably incorporated into the design of house 10 and comprise part of the method described in this application.

Due to the number of fans used in the embodiments disclosed above, it is desirable to stage the fans "ON" one or two at a time. This reduces stress on the utility company power transformer or standby generator. Fan motors draw 6 to 7 times more current during start up than at operating speed. Spreading out the load on the system increases reliability and reduces peak power consumption.

Description of Curtain Release Device

Figure 2:
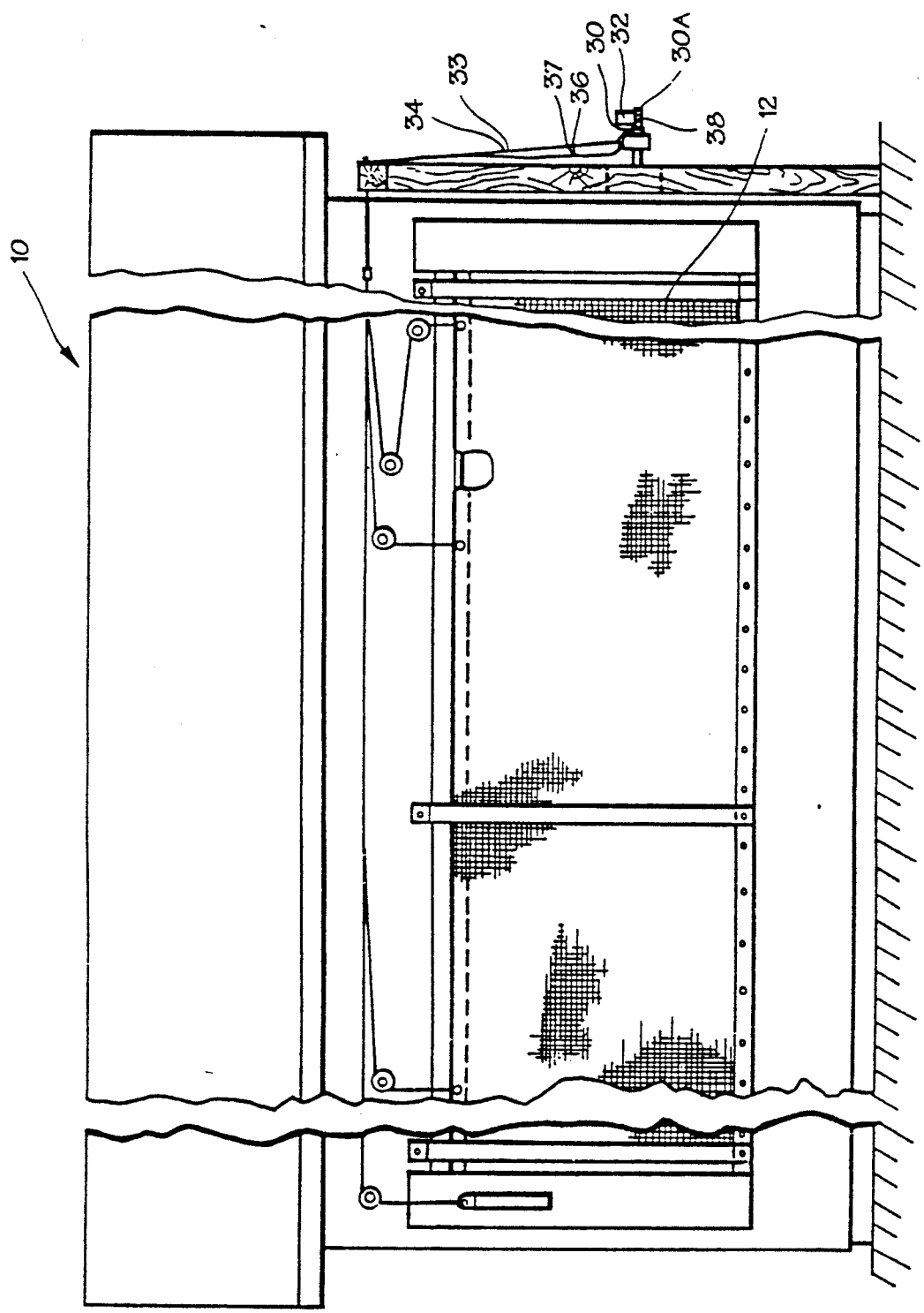
FIG. 2 is a fragmentary side elevation of the poultry house shown in FIG. 1.

In accordance with the invention, a new type of curtain release device has been developed which operates to release the winch 30 of the drop curtains 12. See FIG. 2. The winch 30, having a crank handle 30A normally holds the curtains in a raised position over the windows 11 of the poultry house 10.

Figure 3:
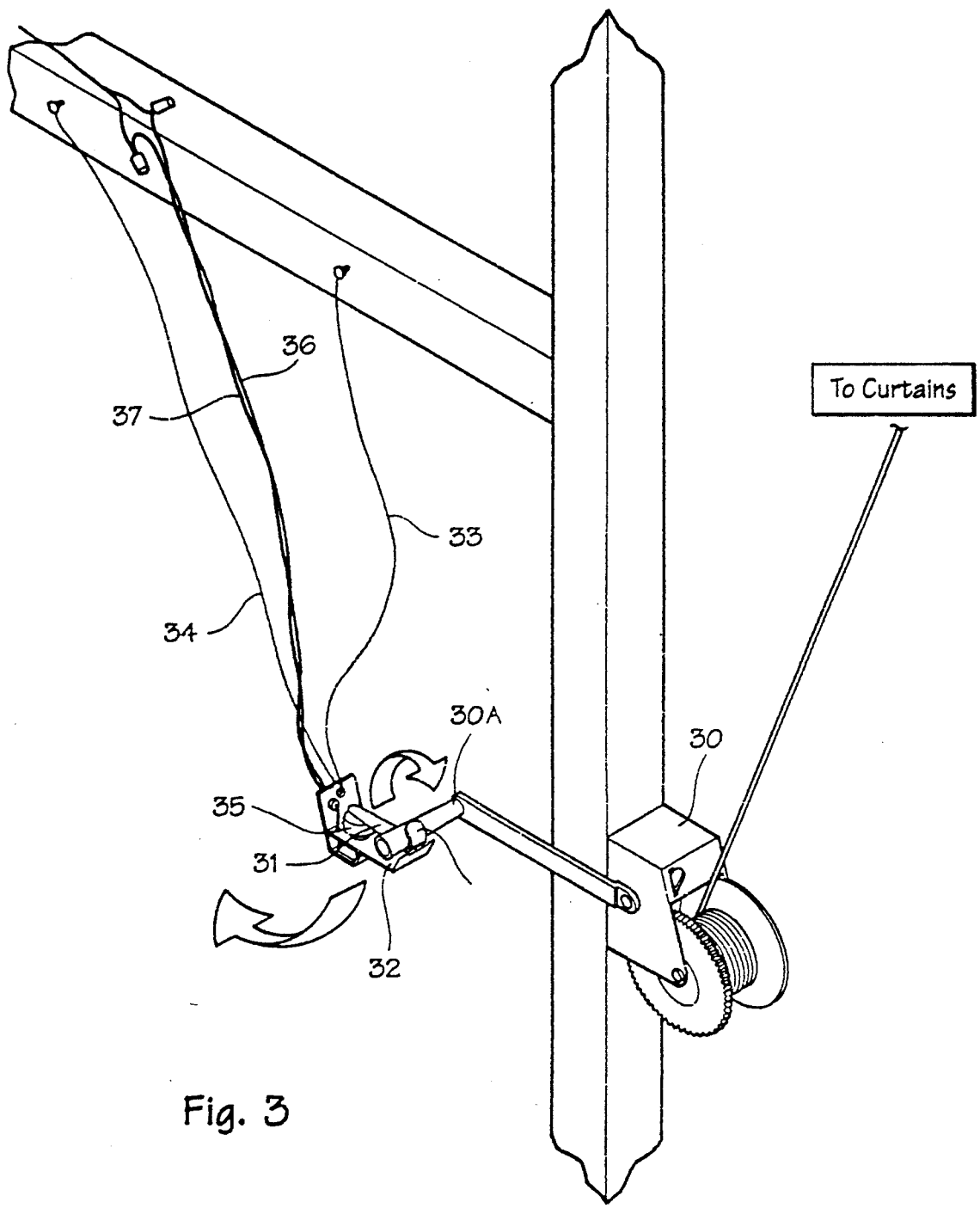
FIG. 3 is a fragmentary perspective view of a curtain release device according to a preferred embodiment of the present invention, with the winch handle in its held position.

Referring now to FIG. 3, the curtain release device includes an electrically-attractable hinge 31 pivotally-mounted on a hinge support plate 32. The hinge support plate 32 is suspended by a pair of spaced-apart cords 33 and 34 to some convenient structure of the poultry house 10. An electromagnet 35 is mounted on the hinge support plate 32, and is supplied with electric current from a power source through wires 36 and 37. The electric current is delivered from the control apparatus 20.

Figure 4:
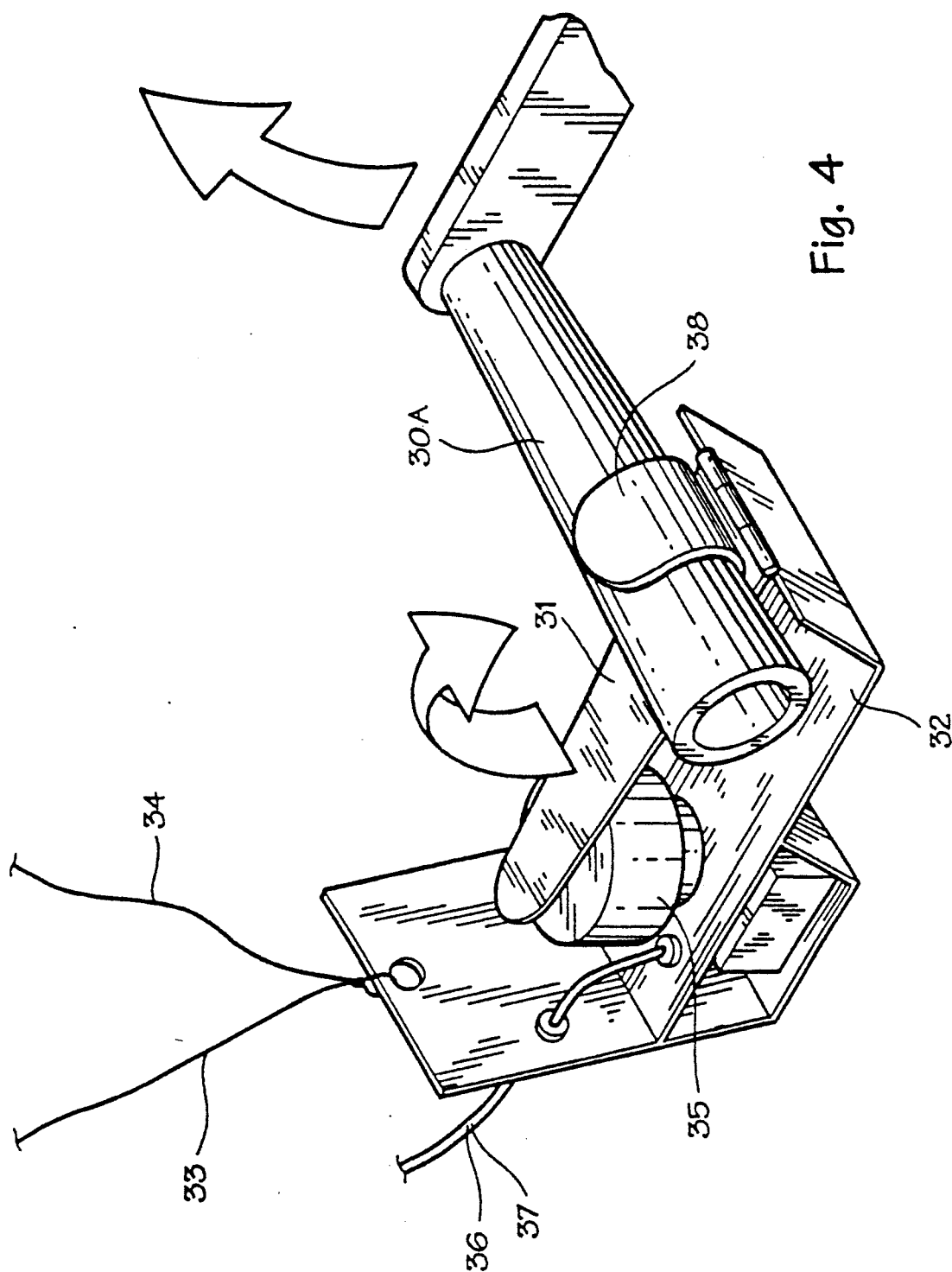
FIG. 4 is an enlarged view according to FIG. 3.
Figure 5:
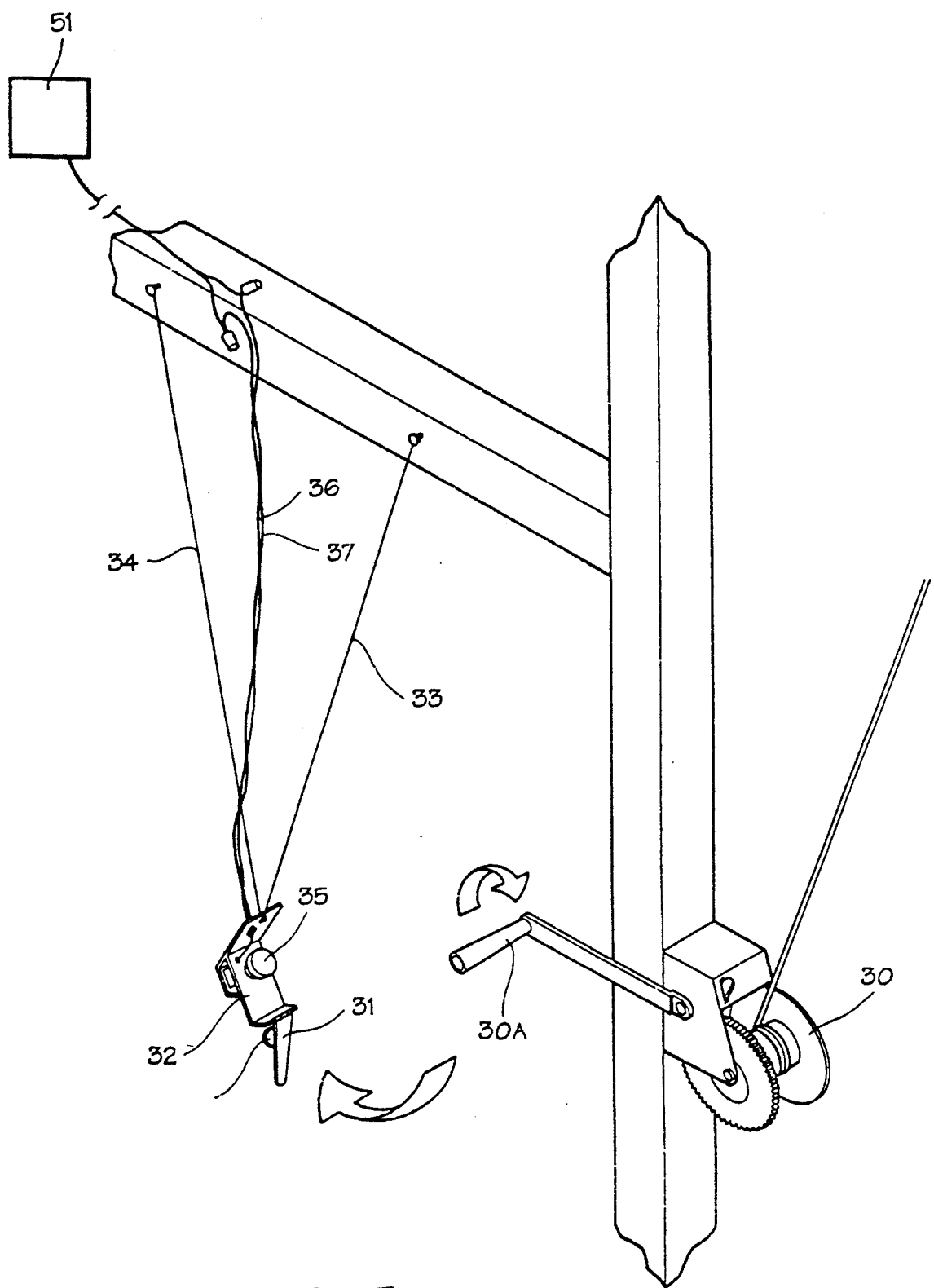
FIG. 5 is a fragmentary perspective view of a curtain release device according to the preferred embodiment of the present invention shown in FIG. 3, with the winch handle in its released position.
Figure 6:
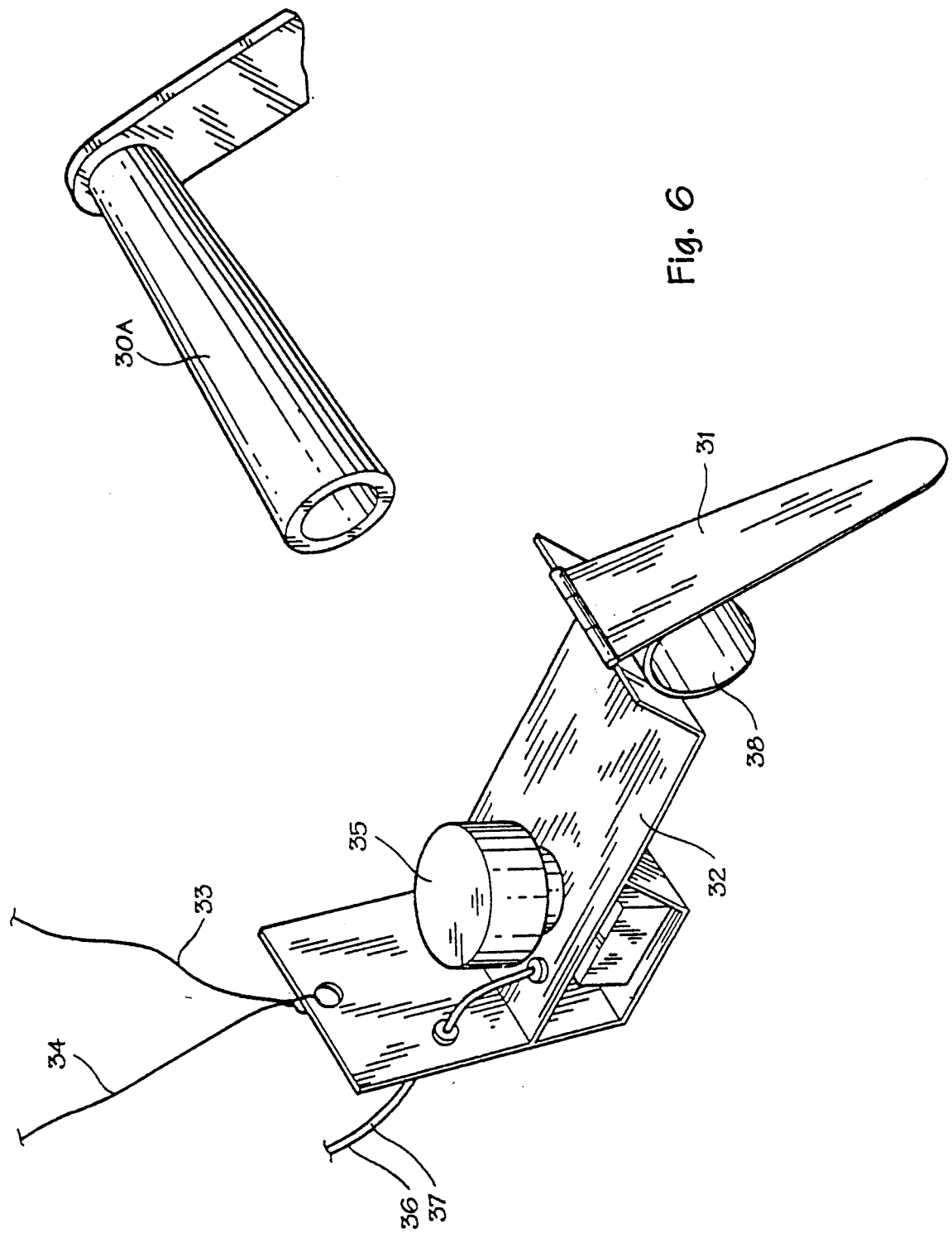
FIG. 6 is an enlarged view according to FIG. 5.

The electromagnet 35 is positioned to attract and retain the hinge 31 when electric current is supplied to the electromagnet 35. A short curved hook 38 is attached to the hinge 31 adjacent the pivot point and is adapted to receive and hold the handle 30A of the winch 30. The pivot angle of the hinge 31 in relation to the position of the handle 30A of the winch 30 is such that the force of the electromagnet 35 is sufficient to prevent release of the winch 30. The correct position is determined empirically. This position is shown in FIG. 3. The curtains are therefore maintained in their raised position. As is shown in FIG. 4, upon occurrence of a condition requiring release of the curtains 12, the current to the electromagnet is interrupted, as will be explained below. The force of the handle 30A of the winch 30 on the hook 38 causes the hinge 31 to pivot into a release position, releasing the handle 30A of the winch 30 and permitting the curtains to fall into their open position, thereby providing emergency ventilation.

Description of Circuit Operation

The Circuitry originally disclosed in U.S. Pat. No. 4,428,278 (See FIG. 7 and discussion at Cols. 4-5) has been substantially enhanced to provide additional functions in accordance with the invention of this application.

Consider the following problems which may occur in the operation of poultry houses:

1. During a very hot day, most, if not all, of the ventilation fans are pulling air the length of the house. A power outage occurs. Soon after the first curtain winch releases, power is restored, preventing the remaining curtains from releasing. The fans come back on when the power is restored, causing an unbalanced air flow through the house from one end from only the area where the curtains were lowered, thereby starving the birds in the remaining areas of the house of proper ventilation.

2. Curtains in the poultry house are raised and lowered by a powered winch control. As temperature falls the winch attempts to close the curtains. The curtains bind on one end and pull on the curtain winch which causes the curtain release mechanism to release, opening the curtains. When the thermostat senses a cooling temperature, the other curtains are closed. The one curtain remains open. The birds on one end get too hot and the ones on the other end get too cool.

Figure 7:
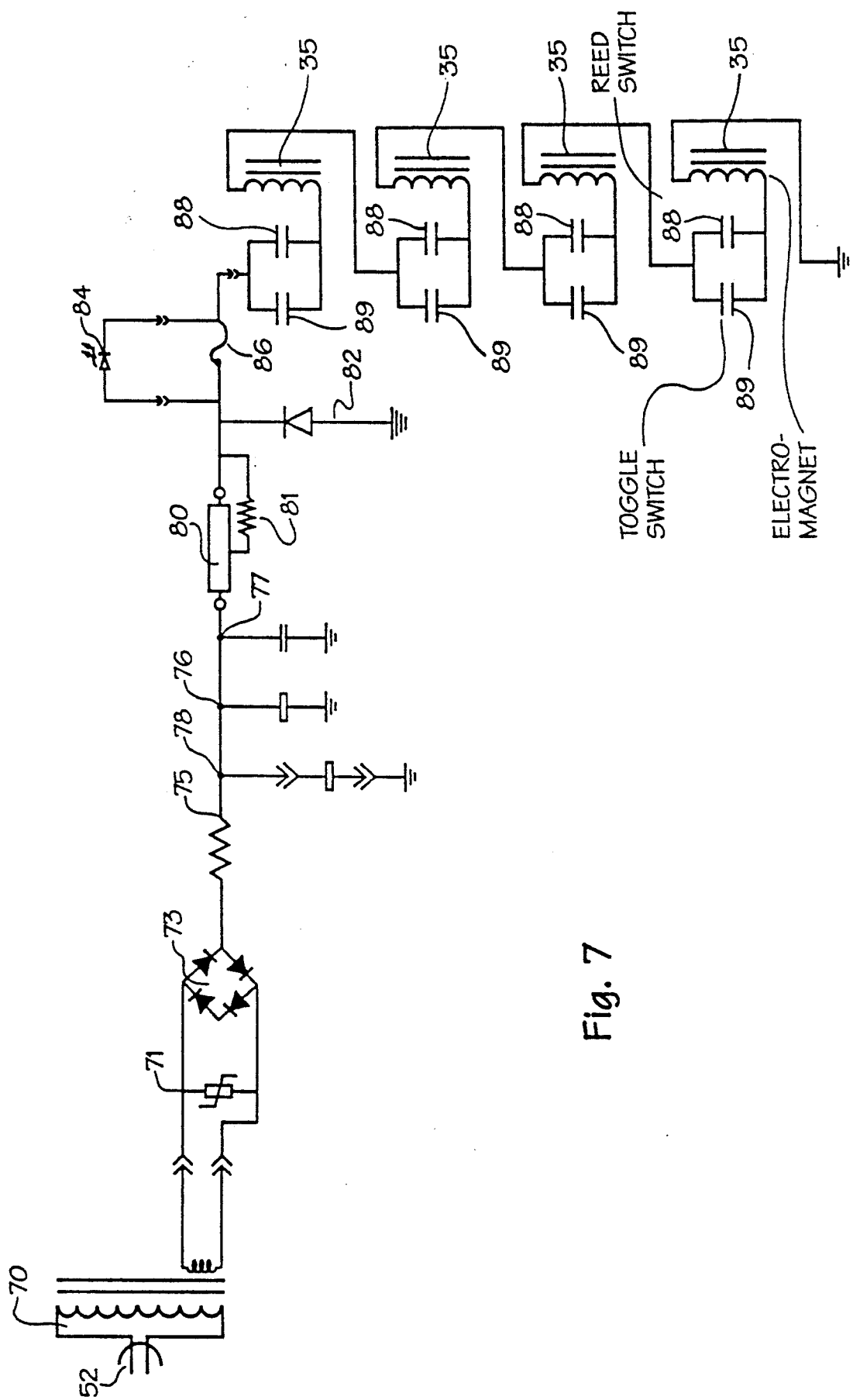
FIG. 7 is an electrical schematic showing the circuitry of the release device.

In both cases, the solution is to insure that if one curtain opens, they all open. Referring to FIG. 7, circuit 50 is contained within a suitably-positioned control box mounted in the poultry house 10. Power is supplied by an electrical conduit 52 from a power source. Circuit 50 provides a delay in interrupting power to the curtains during momentary power outages such as might occur during lightning strikes, etc. The power supply to circuitry 54 is usually that which is supplied to ventilation fans 17 and 19. Most of the large size, high capacity fans operate on 230 volts. However, in other instances circuitry 50 may be plugged into 115 volt service. In either case, a step-down transformer 70 is used to drop the incoming voltage down to between 20 and 30 volts AC.

A metal oxide varister 71 is placed across the output of transformer 70 to protect circuit 50 from lightning and other transient occurrences which might otherwise cause circuit damage.

The output from transformer 70 feeds a bridge rectifier 73 which converts the incoming AC to DC current. The DC current passes through a resistor 75 which smoothes the DC current and limits the current passing through bridge rectifier 73. The direct current is filtered by capacitors 76 and 77. A relatively large capacity capacitor 78 holds a large charge of DC current so that in the event of a loss of AC current as the transformer 70, capacitor 78 will feed direct current through the circuitry to electromagnet 35 for approximately 30 seconds. Of course, by changing the capacity of the capacitor 78 the time delay can be increased or decreased, and thus the period of delay before the electromagnets 35 are released.

Direct current from resistor 75 or capacitor 78 is fed to a current regulator 80. Current regulator 80 is provided to maintain a constant current power supply so that when capacitor 78 is feeding current to electromagnet 35, the discharge will be sufficiently slow to provide the desired delay in interruption of current to the electromagnets 35. The current regulator 80 also permits as many as four electromagnets 35 to be wired in series without any loss of magnetism. The amount of current that current regulator 80 meters and delivers to the magnet 59 is determined by the size of a resistor 81. A diode 82 is included to prevent damage to current regulator 80.

A light emitting diode 84 is included in the circuit to provide visual means of indicating that current is being supplied to electromagnets 35. A fuse 86 prevents a power supply overload.

In order to insure that all of the electromagnets 35 are deactivated at the same time, and at any time when any one is activated, reed switches 88 are provided—one for each of the four electromagnets 35 shown in the exemplary view of FIG. 7. These reed switches 88 are wired in series with the respective electromagnets 35 and close its contacts in the presence of a magnetic field.

Toggle switches 89 are wired in parallel with the respective reed switch 88, and in series with the respective electromagnet 35. When power is initially applied the toggle switches 89 bypass the reed switches 88 and energizes the electromagnets 35. When all of the toggle switches 89 are positioned in the bypass position, and the curtain release devices are in the hold position, the reed switches are closed by magnetism in the electromagnets, not by electric current. Then the toggle switches 89 can be turned off. Power then flows through the reed switches for as long as the hinge 31 is closed. The hinge 31 relays the magnetism to the reed switches 88 when the hinge is closed through the creation of a "horseshoe" magnet effect. When the hinge 31 opens on any one of the systems, the horseshoe magnet effect is lost to that particular reed switch 88. That particular reed switch 88 opens, thereby opening the entire series circuit and stopping the flow of current to all of the electromagnets 35.

This function keeps from having only some of the curtains 12 from opening and thereby interrupting the properly balanced flow of air to all areas of the poultry house 10.

A curtain control system for animal enclosures is described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

I claim:

1. In a curtain control system for controlling curtains of an animal enclosure having an electrically-operated forced air ventilation system and a plurality of adjustable drop curtains, each of said drop curtains having an associated curtain control device for providing supplemental ventilation during power failure or excess temperatures in the enclosure; each of the curtain control devices including a winch for winding and unwinding a curtain control cord extending between the curtain and the winch, the winch having stop means for holding the winch, winch release means moveable between a hold position for normally holding the winch handle stationary to prevent unwinding of the curtain control cord and a release position to release the winch handle and thereby release of the curtains to a dropped, open position; electromagnet means for holding the winch release means in the hold position during application of current thereto, and permitting movement of the winch release means to the release position upon interruption of electric current to the electromagnet means;

the improvement comprising:

(a) circuit means electrically cooperating with the electromagnet means for interrupting the flow of electricity to all of the curtain control devices upon movement or change of any single winch release means to the release position to thereby cause the release of all of the curtains upon the release of any of the curtains.

2. A curtain control system according to claim 1, wherein said circuit means includes:

(a) a reed switch wired in series with said electromagnet means and having a closed position in the presence of a magnetic field and an open position in the absence of a magnetic field;

(b) a toggle switch wired in series with said electromagnet means and in parallel with said reed switch and having a closed position for initiating the flow of electricity to the electromagnet; and (c) each of plurality of said curtain control devices being wired in series with each other.

3. In a curtain control system according to claim 1, wherein said winch release means comprises an electrically-attractable hinge pivotable between said hold position in contact with an electromagnet, and said release position in a pivoted, spaced-apart position from said electromagnet; and a hook attached to said hinge for receiving and retaining the winch stop means against unwinding while the release means is in the hold position.

4. In a curtain control system according to claim 3, wherein said hook is adjustable to a manual, non-automatic position to manually hold the winch holding means when the electric power is interrupted to the winch release means.

5. A method of controlling the curtains of an animal enclosure having an electrically-operated forced air ventilation system and a plurality of adjustable drop curtains, each of said drop curtains having an associated curtain control device for providing supplemental ventilation during power failure or excess temperatures in the enclosure; each of the curtain control devices including a winch for winding and unwinding a curtain control cord extending between the curtain and the winch, the winch having a winch holding means, winch release means moveable between a hold position for normally holding the winch handle stationary to prevent unwinding of the curtain control cord and a release position to release the winch holding means and thereby release of the curtains to a dropped, open position; electromagnet means for holding the winch release means in the hold position during application of current thereto, and permitting movement of the winch release means to the release position upon interruption of electric current to the electromagnet means;

the improved method comprising the steps of:
(a) interrupting the flow of electricity to all of the curtain control devices upon movement or change of any single winch release means to the release position; and (b) thereby causing the release of all of the curtains upon interruption and release of any of the curtains.

6. An improved method according to claim 5, and including the further steps of:
(a) providing a reed switch wired in series with said electromagnetic means and having a closed position in the presence of magnetic field and an open position in the absence of magnetic field;
(b) providing a toggle switch wired in series with said electromagnetic means and in parallel with said reed switch and having a closed position for initiating the flow of electricity to the electromagnets;
(c) wiring each of plurality of said curtain control devices in series with each other; and
(d) thereby causing the release of all of the curtains upon the interruption of electric current or release of any of the curtains.

* * * * *